US012500370B2

(12) United States Patent
Yanagida et al.

(10) Patent No.: US 12,500,370 B2

(45) Date of Patent: Dec. 16, 2025

(54) CONNECTION DEVICE USING CONNECTOR

(71) Applicants: TOYOTA JIDOSHA KABUSHIKI KAISHA, Toyota (JP); Sumitomo Wiring Systems, Ltd., Yokkaichi (JP)

(72) Inventors: Eiji Yanagida, Okazaki (JP); Takahisa Yashiro, Nagoya (JP); Takashi Imakawa, Okazaki (JP); Keita Fukata, Kariya (JP); Soichiro Inukai, Yokkaichi (JP)

(73) Assignees: TOYOTA JIDOSHA KABUSHIKI KAISHA, Toyota (JP); SUMITOMO WIRING SYSTEMS, LTD., Yokkaichi (JP)

( * ) Notice: Subject to any disclaimer, the term of this patent is extended or adjusted under 35 U.S.C. 154(b) by 287 days.

(21) Appl. No.: 18/285,453

(22) PCT Filed: Mar. 29, 2022

(86) PCT No.: PCT/JP2022/015697

§ 371 (c)(1),
(2) Date: Oct. 3, 2023

(87) PCT Pub. No.: WO2022/239555

PCT Pub. Date: Nov. 17, 2022

(65) Prior Publication Data

US 2024/0186745 A1 Jun. 6, 2024

(30) Foreign Application Priority Data

May 13, 2021 (JP) ................................. 2021-081987

(51) Int. Cl.
*H01R 13/52* (2006.01)
*H01R 13/502* (2006.01)

(52) U.S. Cl.
CPC ....... *H01R 13/5208* (2013.01); *H01R 13/502* (2013.01)

(58) Field of Classification Search
CPC .............. H01R 13/5208; H01R 13/502; H01R 13/5205; H01R 13/52
See application file for complete search history.

(56) References Cited

U.S. PATENT DOCUMENTS 7,270,556 B2 * 9/2007 Mori .................. H01R 13/5208 439/272
2015/0207260 A1 * 7/2015 Sugiyama ............ H01R 13/426 439/752

(Continued)

FOREIGN PATENT DOCUMENTS

JP 02-083617 U1 6/1990
JP 09-035767 A 2/1997

(Continued)

OTHER PUBLICATIONS

International Search Report for PCT/JP2022/015697 dated Jun. 21, 2022 [PCT/ISA/210].

(Continued)

*Primary Examiner* — Abdullah A Riyami
*Assistant Examiner* — Nader J Alhawamdeh
(74) *Attorney, Agent, or Firm* — Sughrue Mion, PLLC

(57) ABSTRACT

A connection device includes a connector provided with wire insertion holes receiving end portions of electrical wires and terminal fittings connected to the end portions. The electrical wires include a lead wire and a dummy wire. One end of the lead wire is inserted in the wire insertion holes while another end of the lead wire is connected to another connector. One end and another end of the dummy wire are inserted in empty ones of the wire insertion holes. A protective tube, which is shorter than the lead wire, is provided between the connector and the other connector, so (Continued)

as to extend over an entire length of the lead wire except opposite end portions of the lead wire and so as to cover the lead wire and the dummy wire. A U-shaped curved end portion of the dummy wire is exposed from an end portion of the protective tube.

3 Claims, 2 Drawing Sheets

(56) References Cited

U.S. PATENT DOCUMENTS

| | | | | |
|---|---|---|---|---|
| 2020/0366006 | A1* | 11/2020 | Nakai | H01R 4/70 |
| 2024/0186745 | A1* | 6/2024 | Yanagida | H01R 13/5208 |

FOREIGN PATENT DOCUMENTS

| | | | | |
|---|---|---|---|---|
| JP | 09-204954 | A | | 8/1997 |
| JP | 2001-126842 | A | | 5/2001 |
| JP | 2001-196129 | A | | 7/2001 |
| JP | 2001217034 | A | * | 8/2001 |
| JP | 2009-054443 | A | | 3/2009 |
| JP | 2012-201345 | A | | 10/2012 |
| JP | 2017-092003 | A | | 5/2017 |

OTHER PUBLICATIONS

Written Opinion for PCT/JP2022/015697 dated Jun. 21, 2022 [PCT/ISA/237].

* cited by examiner

CONNECTION DEVICE USING CONNECTOR

CROSS REFERENCE TO RELATED APPLICATIONS

This application is a National Stage of International Application No. PCT/JP2022/015697 filed Mar. 29, 2022, claiming priority based on Japanese Patent Application No. 2021-081987 filed May 13, 2021.

TECHNICAL FIELD

The present invention relates to a connection device with a connector in which an empty one of a plurality of wire insertion holes can be closed, and to such a connection device that is versatile even with change of shape of the connector, for example.

BACKGROUND ART

There is known a connector provided with a plurality of electrical wires and a housing formed with a plurality of wire insertion holes receiving end portions of the electrical wires and terminal fittings connected to the end portions. In such a connector, when all of the wire insertion holes are not used, foreign matter can readily enter empty ones of wire insertion holes, which may reduce reliability of contact between the terminal fittings and terminal fittings in the mating connector.

On the other hand, in a connector described in Patent Document 1, a plurality of wire insertion holes are exposed through an opening of a holding cover, and a dummy plug is inserted into an empty one of the wire insertion holes in a waterproof member so as to close the empty one of the wire insertion holes. This allows the connector to be applied to a smaller number of electrical wires than a total number of the wire insertion holes without requiring any design changes to the housing or waterproof member, for example.

PRIOR ART DOCUMENT

Patent Document

Patent Document 1: JP 2001-196129A

DISCLOSURE OF THE INVENTION

Object to be Achieved by the Invention

By the way, in the above-described connector, each time when specifications of the housing such as dimensions, shape and material are changed due to design modifications to improve functions or materials, it is necessary to redesign length and diameter of the dummy plug that closes the empty hole in the connector, resulting in a lack of versatility.

The present invention was made in view of the background discussed above. It is therefore an object of the present invention to provide a connection device with a connector that does not require change of design of a member closing an empty one of wire insertion holes of the connector even if specifications of the connector are changed.

Measures for Solving the Problem

The gist of a first invention is, in (a) a connection device comprising a plurality of electrical wires and a connector that is provided with a plurality of wire insertion holes receiving end portions of the electrical wires and terminal fittings connected to the end portions, that (b) the plurality of electrical wires include a lead wire and a dummy wire that is the same in kind as the lead wire, such that one end of the lead wire is inserted in the wire insertion holes while another end of the lead wire is connected to another connector, and such that one end and another end of the dummy wire are inserted in a pair of empty ones of the wire insertion holes.

The gist of a second invention is, in the first invention, that a tubular-shaped protective tube, which is shorter than the lead wire, is provided between the connector and the other connector so as to cover the lead wire and the dummy wire, the dummy wire includes a curved end portion which is curved in U shape and which is located on side of the other connector, and the curved end portion of the dummy wire is exposed from an end portion of the protective tube which is located on side of the other connector.

The gist of a third invention is, in the first or second invention, that the connector includes a housing that is provided with the plurality of wire insertion holes, and the terminal fittings, which are received in the wire insertion holes of the housing, are connected to both end portions of the dummy wire.

The gist of a fourth invention is, in the first or second invention, that the connector includes: a housing that is provided with the plurality of wire insertion holes; a waterproof member superposed on the housing and having the plurality of wire insertion holes into which the electrical wires are inserted in a watertight manner and a housing waterproof portion fitted to the housing in a watertight manner: and a holding cover holding the waterproof member such that the waterproof member is not removed from the housing, and that the one end and the other end of the dummy wire are inserted in the wire insertion holes provided in the waterproof member, or in the wire insertion holes provided in the waterproof member and in the housing.

Effects of the Invention

In the connection device with the connector according to the first invention, there are the plurality of electrical wires and the plurality of wire insertion holes that receive the end portions of the electrical wires and the terminal fittings connected to the end portions, wherein the plurality of electrical wires include the lead wire and the dummy wire that is the same in kind as the lead wire, such that the one end of the lead wire is inserted in the wire insertion holes while the other end of the lead wire is connected to the other connector, and such that the one end and the other end of the dummy wire are inserted in the pair of empty ones of the wire insertion holes. Therefore, it is possible to obtain the connection device with the connector, which does not require change of design of members for closing empty ones of the wire insertion holes, even in case of change of specifications of the connector.

In the connection device with the connector according to the second invention, the tubular-shaped protective tube, which is shorter than the lead wire, is provided between the connector and the other connector so as to cover the lead wire and the dummy wire, the dummy wire includes the curved end portion which is curved in U shape and which is located on side of the other connector, and the curved end portion of the dummy wire is exposed from the end portion of the protective tube which is located on side of the other connector. Therefore, visual inspection can be easily performed to check that the dummy wire has been inserted into an empty wire insertion hole and another empty wire insertion hole.

In the connection device with the connector according to the third invention, the connector includes the housing that is provided with the plurality of wire insertion holes, and the terminal fittings, which are received in the wire insertion holes of the housing, are connected to both of the end portions of the dummy wire. Therefore, the dummy wire also has the same retention performance as the lead wire, which is secured by connecting the terminal fitting to the end of the lead wire and inserting the lead wire into the housing space.

In the connection device with the connector according to the fourth invention, the connector includes: the housing that is provided with the plurality of wire insertion holes: the waterproof member superposed on the housing and having the plurality of wire insertion holes into which the electrical wires are inserted in a watertight manner and the housing waterproof portion fitted to the housing in a watertight manner: and the holding cover holding the waterproof member such that the waterproof member is not removed from the housing, wherein the one end and the other end of the dummy wire are inserted in the wire insertion holes provided in the waterproof member, or in the wire insertion holes provided in the waterproof member and in the housing. Thus, the one end and the other end of the dummy wire, which is the same in kind as the lead wire, are inserted in the wire insertion holes provided in the waterproof member, or in the wire insertion holes provided in the waterproof member and in the housing, so that it is possible to prevent not only foreign matter from entering, but also water and dust from entering.

MODES FOR CARRYING OUT THE INVENTION

There will be described an embodiment of the present invention in details with reference to drawings. It is noted that figures of the drawings are simplified or deformed as needed, and each portion is not necessarily precisely depicted in terms of dimension ratio, shape, etc.

Embodiment

Figure 1:
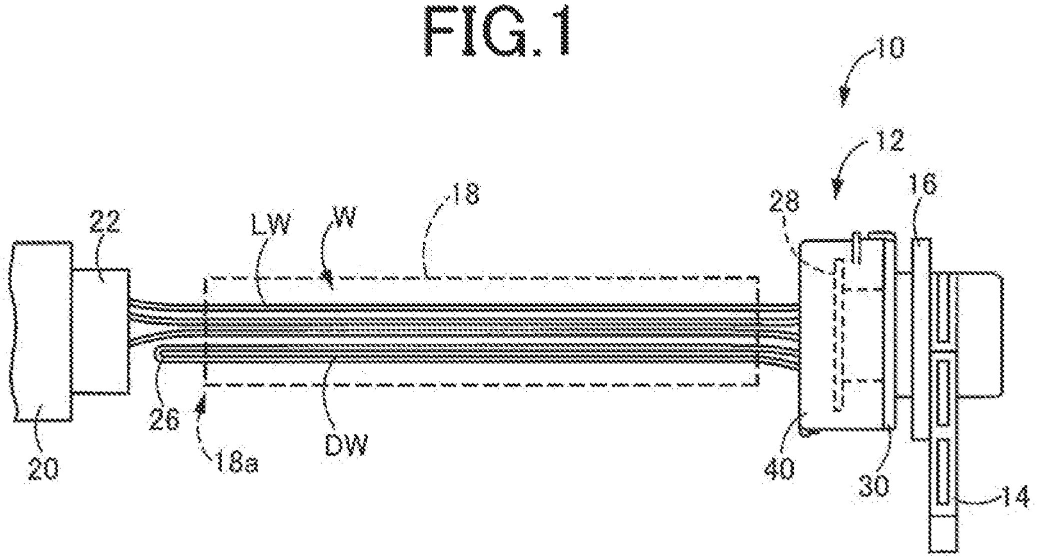
FIG. 1 is a view for explaining a state of connection between a waterproof connector and another connector that are provided in a connection device according to an embodiment of the present invention.

FIG. 1 shows a connection device 10 with a waterproof connector 12 to which the present invention is advantageously applied. In FIG. 1, the connection device 10 is provided with a plurality of electrical wires W and the waterproof connector 12. The waterproof connector 12 is fitted to a mating connector 16 supported by a bracket 14 that is disposed in a fixed position. The waterproof connector 12 is connected through the plurality of electrical wires W to another connector 22 that is paired with the waterproof connector 12. The other connector 22 is provided in a device 20 in a vehicle, such as a resolver configured to detect a phase angle of a rotary body.

The electrical wires W located between the waterproof connector 12 and the other connector 22 include a plurality of lead wires LW and a dummy wire DW. One end of each of the lead wires LW is inserted in a corresponding one of wire insertion holes 38 that are described later, and another end of each of the lead wires LW is connected to the other connector 22. One end of the dummy wire DW is inserted in an empty one of the wire insertion holes 38, and another end of the dummy wire DW is inserted in another empty one of the wire insertion holes 38. The dummy wire DW is an electric wire that is the same in kind as the lead wires LW, and is the same as the lead wires LW, for example, in terms of outside diameter, core wire, coating material and standards.

In the connection device 10 with the waterproof connector 12, a tubular-shaped protective tube 18 is provided between the waterproof connector 12 and the other connector 22. The protective tube 18 is shorter than the lead wires LW, and covers the lead wires LW and the dummy wire DW that is curved in U shape in its end portion on side of the other connector 22. The protective tube 18 is a so-called glass varnish tube made of woven glass fiber fabric sewn into a cylindrical shape and impregnated with varnish. A curved end portion 26 of the dummy wire DW, which is curved in U shape, is exposed from an end portion 18*a* of the protective tube 18 on side of the other connector 22 so that the curved end portion 26 of the dummy wire DW is visible.

Figure 2:
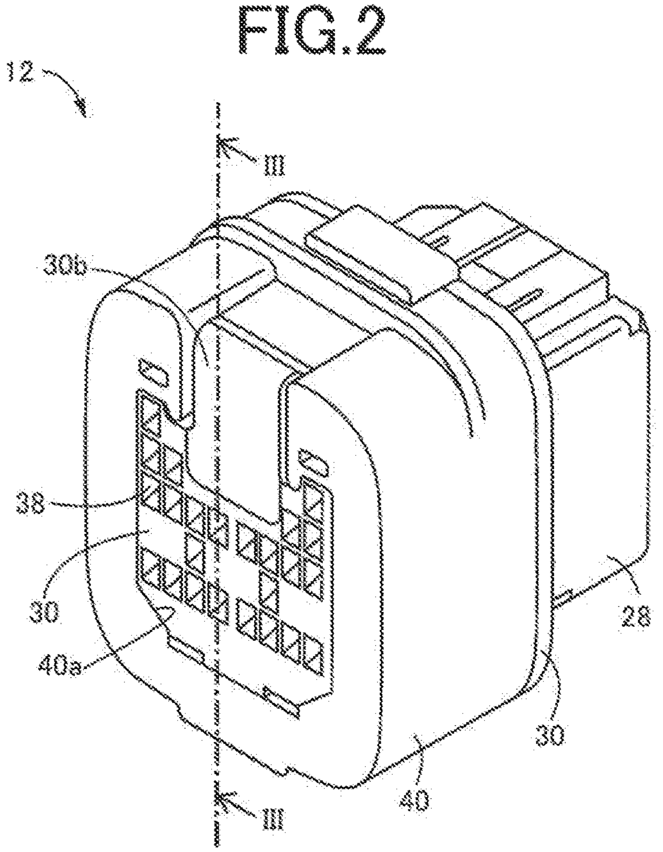
FIG. 2 is an enlarged perspective view for explaining the waterproof connector in the embodiment of FIG. 1.
Figure 3:
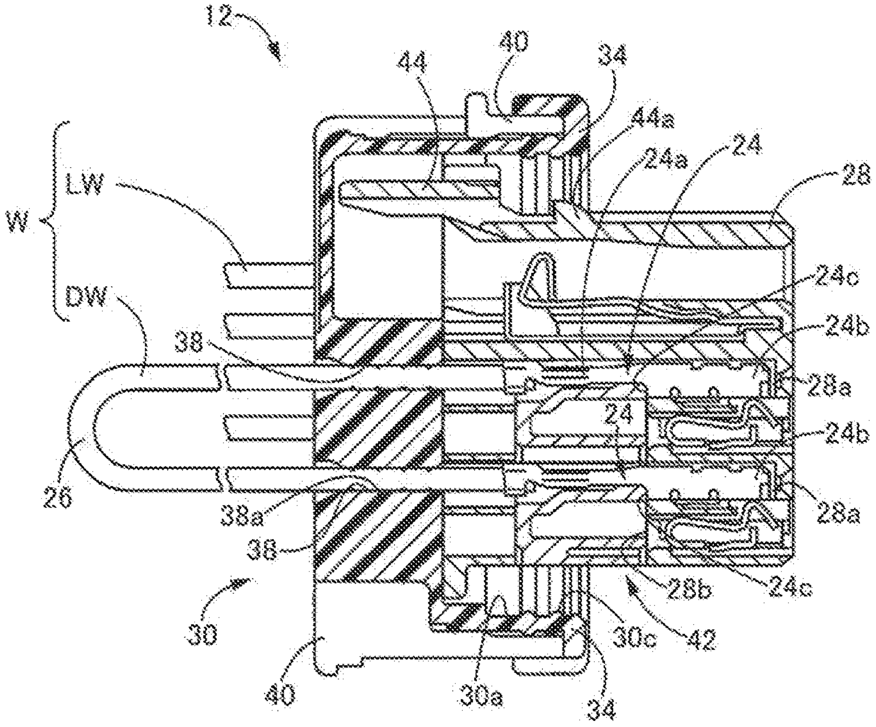
FIG. 3 is a cross sectional view for explaining an internal structure of the waterproof connector of FIG. 2 in a state in which a plurality of electrical wires are inserted, wherein the cross sectional view is taken from III-III in FIG. 2.

FIG. 2 is a perspective view of the waterproof connector 12. The waterproof connector 12 includes a housing 28 made of hard resin, a waterproof member 30 superposed on an end face of the housing 28 on side of the electrical wires W, and a holding cover 40 which is made of hard resin and which retains the waterproof member 30 such that the waterproof member 30 is not removed from the housing 28. FIG. 3 is a cross sectional view for explaining an internal structure of the waterproof connector 12 in a state in which the plurality of electrical wires W are inserted, wherein the cross sectional view is taken from III-III in FIG. 2. A plurality of housing spaces 28*a* are formed through the housing 28. The housing spaces 28*a* can house end portions of the electrical wires W and terminal fittings 24 attached to the end portions of the electrical wires W. The housing spaces 28*a* serve as wire insertion holes in the housing 28 into which the end portions of the electrical wires W are inserted. Each of the accommodation spaces 28*a* constitutes a prismatic space passing through a rear face of the housing 28 and a front face of the housing 28, wherein the rear face of the housing 28 is located on side of the other connector 22 while the front face of the housing 28 is located on side of the mating connector. The waterproof member 30 has the wire insertion holes 38 and a housing waterproof portion 34. Each of the electrical wires W includes a portion which reaches the housing space 28*a* and which is adjacent to side of the other connector 22, and such a portion of each of the electrical wires W can be inserted in the wire insertion hole 38 in a watertight manner. The housing waterproof portion 34 is made of a rubber or a resin softer than the housing 28 and is fitted to the housing 28 in a watertight manner.

As shown in FIG. 3, each of the terminal fittings 24 includes a connected portion 24*a*, a rectangular-tubular connecting portion 24*b* and a stepped engaged portion 24*c*. The connected portion 24*a* is crimped and connected to a core wire exposed in the end portion of the electrical wire W. The engaged portion 24*c* following the connected portion

24*a* is located between the connected portion 24*a* and the connecting portion 24*b*. Each of the terminal fittings 24 is formed by pressing and bending a conductive metal plate such as a copper plate. The housing spaces 28*a* of the housing 28 in which the terminal fittings 24 are housed are formed to penetrate through the housing 28, such that bar terminals of the mating connector 16 are inserted in the housing spaces 28*a*. The terminal fittings 24 are fitted to an end portion of the lead wire LW and to both end portions of the dummy wire DW.

In the present embodiment, the engaged portions 24*c* of the terminal fittings 24 are engaged to a retainer 42 that is fitted in a retainer fitting opening 28*b* opening in a lower surface of the housing 28 (i.e., lower side surface as seen in FIG. 3), so that the terminal fittings 24 are retained. The retainer 42 serves as a toward retaining member for retaining the electrical wires W. The retainer 42 can be positioned in two positions relative to the housing 28, wherein the two positions are a relatively shallow temporary engagement position and an engagement position (i.e., position shown in FIG. 3) that is deeper than the temporary engagement position. When the retainer 42 is positioned in the temporary engagement position, the terminal fittings 24 are allowed to be inserted into and removed from the housing spaces 28*a*. When the retainer 42 is positioned in the engagement position, the engaged portions 24*c* of the terminal fittings 24 are engaged with corners of the retainer 42 so that the terminal fittings 24 are avoided from being removed from the housing spaces 28*a*.

On an upper surface (i.e., upper side surface as seen in FIG. 3) of the housing 28, an elongated lock arm 44 is provided integrally in a cantilever manner. The elongated lock arm 44 is elastically deformable in upward and downward directions, and includes an engagement protrusion 44*a* that is provided in its longitudinally central portion. The engagement protrusion 44*a* protrudes outwardly (i.e., upwardly as seen in FIG. 3), and is engaged with the mating connector 16 so as to avoid removal of the engagement protrusion 44*a*. The lock arm 44 is in brought into contact at is distal end with an inside surface of the waterproof member 30, so as to keep the waterproof member 30 in a predetermined position.

As shown in FIG. 3, the waterproof member 30 is made of an easily elastically deformable material such as synthetic rubber, and is formed to have a box shape. The waterproof member 30 is provided with an assembly opening 30*a* in which the housing 28 is fitted, so as to cover an entire side of the housing 28 that is located on side of the electrical wires W. The assembly opening 30*a* has a shape that enables a portion of the housing 28 including the lock arm 44, to be housed inside the waterproof member 30. The waterproof member 30 has an operation portion 30*b* shown in FIG. 2, which is provided in a bottom surface of the waterproof member 30, such that the lock arm 44 can be pushed by pressing the operation portion 30*b* from outside of the waterproof member 30. A plurality of ridges 30*c* are formed along an entire circumference on an inner surface of the assembly opening 30*a*.

The waterproof member 30 is provided with the plurality of wire insertion holes 38 which pass therethrough and which that are located in positions corresponding to the housing spaces 28*a* of the housing 28. A plurality of annular ridges 38*a* are formed on inner wall surfaces of the wire insertion holes 38. The annular ridges 38*a* have an inside diameter that is slightly smaller than an outside diameter of the electrical wires W, so that the annular ridges 38*a* are pressed against outer circumferential surfaces of the electrical wires W so as to provide a watertight structure.

In the cross sectional view of FIG. 3, among the plurality of electrical wires W, although the lead wire LW is not shown in the cross section, the dummy wire DW is shown in the cross section. Among the wire insertion holes 38, the pair of empty ones of them in which the dummy wire DW is inserted does not have to be necessarily located in a position shown in FIG. 3.

As shown in FIG. 2, the holding cover 40 is made of synthetic resin, and covers the waterproof member 30. The holding cover 40 is formed to a box shape, and has a rectangular opening 40*a* in its bottom surface, such that the wire insertion holes 38 formed in the waterproof member 30 are exposed through the rectangular opening 40*a*. The holding cover 40 is provided with an engagement arm (not shown) which projects toward the housing 28 and which is engaged with an engagement recessed portion (not shown) formed in the housing 28, so that the holding cover 40 is fixed to the housing 28 while holding the waterproof member 30.

As described above, in the connection device 10 with the waterproof connector 12 according to the present embodiment, there are the plurality of electrical wires W and the plurality of wire insertion holes (i.e., the wire insertion holes 38 and the housing spaces 28*a*) that receive the end portions of the electrical wires W and the terminal fittings 24 connected to the end portions, wherein the plurality of electrical wires W include the lead wire LW and the dummy wire DW that is the same in kind as the lead wire LW, such that the one end of the lead wire LW is inserted in the wire insertion holes while the other end of the lead wire LW is connected to the other connector 22, and such that the one end and the other end of the dummy wire DW are inserted in the pair of empty ones of the wire insertion holes. Therefore, it is possible to obtain the connection device 10 with the waterproof connector 12, which does not require change of design of members for closing empty ones of the wire insertion holes (i.e., the wire insertion holes 38 of the waterproof member 30 and the housing spaces 28*a*), even where some of the wire insertion holes of the waterproof connector 12 are to become empty with change of specifications or application of the waterproof connector 12.

Further, in the connection device 10 with the waterproof connector 12 according to the present embodiment, the tubular-shaped protective tube 18, which is shorter than the lead wire LW, is provided between the waterproof connector 12 and the other connector 22 so as to cover the lead wire LW and the dummy wire DW, the dummy wire DW includes the curved end portion 26 which is curved in U shape and which is located on side of the other connector 22, and the curved end portion 26 of the dummy wire DW is exposed from the end portion of the protective tube 18 which is located on side of the other connector 22. Therefore, visual inspection can be easily performed to check that the dummy wire DW has been inserted into an empty wire insertion hole (28*a*, 38) and another empty wire insertion hole (28*a*, 38).

Further, in the connection device 10 with the waterproof connector 12 according to the present embodiment, the waterproof connector 12 includes the housing 28 that is provided with the plurality of housing spaces (wire insertion holes) 28*a*, and the terminal fittings 24, which are received in the housing spaces 28*a*, are connected to both of the end portions of the dummy wire DW. Therefore, the dummy wire DW also has the same retention performance as the lead wire LW, which is secured by connecting the terminal fitting

24 to the end of the lead wire LW and inserting the lead wire LW into the housing space 28*a* of the housing 28.

Further, in the connection device 10 with the waterproof connector 12 according to the present embodiment, the waterproof connector 12 includes: the housing 28 that is provided with the plurality of housing spaces (wire insertion holes) 28*a*: the waterproof member 30 superposed on the housing 28 and having the plurality of wire insertion holes 38 into which the electrical wires W are inserted in a watertight manner and the housing waterproof portion 34 fitted to the housing 28 in a watertight manner; and the holding cover 40 holding the waterproof member 30 such that the waterproof member 30 is not removed from the housing 28, wherein the one end and the other end of the dummy wire DW are inserted in the wire insertion holes 38 provided in the waterproof member 30, or in the wire insertion hole 38 and the housing space 28*a* provided in the waterproof member 30 and in the housing 28. Thus, one of the one end and the other end of the dummy wire DW, which is the same in kind as the lead wire LW, are inserted in at least the wire insertion hole 38 provided in the waterproof member 30, so that it is possible to prevent not only foreign matter from entering, but also water and dust from entering.

Although the embodiment of the present invention has been described in detail with reference to the drawings, the present invention is also applicable to other forms.

For example, in the above-described embodiment, an example using one dummy wire DW is shown, but two or more dummy wires DW may be used.

Further, in the above-described embodiment, the number of housing spaces 28*a* of the housing 28 and the number of wire insertion holes 38 of the waterproof member 30 may be changed as needed depending on the purposes, and the shapes or structures of the housing 28 and the waterproof member 30 may be modified or improved in various ways.

Further, in the above-described embodiment, the holding cover 40, which is made of the hard resin and which is provided to hold the waterproof member 30 for avoiding removal of the waterproof member 30 from the housing 28, does not necessarily have to be provided, where the structure for fixing the housing 28 and the waterproof member 30 is reliable one.

Further, in the above-described embodiment, the terminal fittings 24 are connected to both of the end portions of the dummy wire DW so as to avoid removal of the dummy wire DW. However, it is possible to use another structure for avoiding the removal of the dummy wire DW. Further, it is not necessary to provide any structure for avoiding the removal of the dummy wire DW, because a large tensile force is not applied to both of the end portions of the dummy wire DW even where the tensile force is applied between the waterproof connector 12 and the other connector 22.

Further, in the above-described embodiment, there has been described the waterproof connector 12 including the waterproof member 30 and the holding cover 40 that is provided to fix the waterproof member 30 to the housing 28. However, the present invention is applicable to, in place of the waterproof connector 12, a connector that does not includes the waterproof member 30 and the holding cover 40 that is provided to fix the waterproof member 30 to the housing 28. In the connection device with such a connector not including the waterproof member 30 and the holding cover 40, there are the plurality of electrical wires W and the housing 28 that is provided with the plurality of electrical housing spaces (wire insertion holes) 28*a* receiving the end portions of the electrical wires W and the plurality of terminal fittings 24 connected to the end portions. In the thus constructed connector, too, it is possible to advantageously prevent foreign matter from entering, since the empty housing space (empty wire insertion hole) 28*a* is closed by the dummy wire DW.

It is to be understood that what has been described above is merely an embodiment of the present invention, and that the present invention may be embodied with various changes and modifications based on knowledges of those skilled in the art.

DESCRIPTION OF REFERENCE SIGNS

10: connection device
12: waterproof connector (connector)
18: protective tube
18*a*: end portion
22: other connector
24: terminal fitting
26: curved end portion
28: housing
28*a*: housing space (wire insertion hole)
30: waterproof member
34: housing waterproof portion
38: wire insertion hole
W: electrical wire
LW: lead wire
DW: dummy wire

The invention claimed is:

1. A connection device comprising a plurality of electrical wires and a connector that is provided with a plurality of wire insertion holes receiving end portions of the electrical wires and terminal fittings connected to the end portions, wherein the plurality of electrical wires include a lead wire and a dummy wire that is the same in kind as the lead wire, such that one end of the lead wire is inserted in the wire insertion holes of the connector while another end of the lead wire is connected to another connector, such that one end and another end of the dummy wire are inserted in a pair of empty ones of the wire insertion holes of the connector, and such that the dummy wire includes a curved end portion which is curved in U shape and which is located on side of the other connector, wherein a tubular-shaped protective tube, which is shorter than the lead wire, is provided between the connector and the other connector, so as to extend over an entire length of the lead wire except opposite end portions of the lead wire and so as to cover the lead wire and the dummy wire, and wherein the curved end portion of the dummy wire is exposed from an end portion of the protective tube which is located on side of the other connector.

2. The connection device according to claim 1, wherein the connector includes a housing that is provided with the plurality of wire insertion holes, and wherein the terminal fittings, which are received in the wire insertion holes of the housing, are connected to both end portions of the dummy wire.

3. The connection device according to claim 1, wherein the connector includes:

a housing that is provided with the plurality of wire insertion holes;

a waterproof member superposed on the housing and having the plurality of wire insertion holes into which the electrical wires are inserted in a watertight manner and a housing waterproof portion fitted to the housing in a watertight manner; and a holding cover holding the waterproof member such that the waterproof member is not removed from the housing, and wherein the one end and the other end of the dummy wire are inserted in the wire insertion holes provided in the waterproof member, or in the wire insertion holes provided in the waterproof member and in the housing.

* * * * *